(12) United States Patent
Sasaki et al.

(10) Patent No.: US 9,390,732 B2
(45) Date of Patent: *Jul. 12, 2016

(54) THERMALLY-ASSISTED MAGNETIC RECORDING HEAD

(71) Applicant: HGST Netherlands B.V., Amsterdam (NL)

(72) Inventors: Shinji Sasaki, Kanagawa (JP); Takuya Matsumoto, Sunnyvale, CA (US); Kentaro Namikawa, Kanagawa (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/748,173

(22) Filed: Jun. 23, 2015

(65) Prior Publication Data

US 2015/0294677 A1 Oct. 15, 2015

Related U.S. Application Data

(63) Continuation of application No. 14/099,787, filed on Dec. 6, 2013, now Pat. No. 9,093,086.

(51) Int. Cl.
*G11B 11/00* (2006.01)
*G11B 5/31* (2006.01)
*G11B 5/00* (2006.01)

(52) U.S. Cl.
CPC .............. *G11B 5/314* (2013.01); *G11B 5/3163* (2013.01); *G11B 5/3169* (2013.01); *G11B 5/3173* (2013.01); *G11B 2005/0021* (2013.01); *Y10T 29/49048* (2015.01)

(58) Field of Classification Search
None
See application file for complete search history.

(56) References Cited

U.S. PATENT DOCUMENTS

| | | | |
|---|---|---|---|
| 5,638,111 A | 6/1997 | Hirokane et al. |
| 6,768,556 B1 | 7/2004 | Matsumoto et al. |
| 8,462,593 B1 | 6/2013 | Komura et al. |
| 8,619,516 B1 | 12/2013 | Matsumoto |
| 9,093,086 B2 | 7/2015 | Sasaki et al. |
| 2003/0015651 A1 | 1/2003 | Kiguchi et al. |
| 2004/0085862 A1 | 5/2004 | Matsumoto et al. |
| 2005/0157393 A1 | 7/2005 | Hasegawa et al. |
| 2006/0221482 A1 | 10/2006 | Matsumoto et al. |
| 2006/0280103 A1 | 12/2006 | Tawa |
| 2007/0177302 A1 | 8/2007 | Shimazawa et al. |
| 2009/0207703 A1 | 8/2009 | Matsumoto et al. |

(Continued)

FOREIGN PATENT DOCUMENTS

JP 2004151049 A 5/2004

OTHER PUBLICATIONS

Notice of Allowance from U.S. Appl. No. 14/099,787, dated Mar. 25, 2015.

(Continued)

*Primary Examiner* — Peter Vincent Agustin
(74) *Attorney, Agent, or Firm* — Zilka-Kotab, PC

(57) ABSTRACT

In one embodiment, a device includes a near-field light transducer having multiple apexes including a trailing-side apex positioned on a trailing side of the near-field light transducer. The device also includes a first material positioned near the trailing-side apex of the near-field light transducer, and a second material positioned near another apex of the near-field light transducer. The first material is physically characterized as etching more slowly than the second material.

20 Claims, 14 Drawing Sheets

(56) References Cited

U.S. PATENT DOCUMENTS

| | | |
|---|---|---|
| 2009/0303861 A1 | 12/2009 | Shintani |
| 2009/0310446 A1 | 12/2009 | Nakaoki et al. |
| 2010/0033865 A1 | 2/2010 | Hashimoto et al. |
| 2010/0073802 A1 | 3/2010 | Komura et al. |
| 2010/0079895 A1 | 4/2010 | Takayama et al. |
| 2011/0096431 A1 | 4/2011 | Hellwig et al. |
| 2011/0096639 A1 | 4/2011 | Matsumoto |
| 2011/0164333 A1 | 7/2011 | Sasaki et al. |
| 2011/0205660 A1 | 8/2011 | Komura et al. |
| 2012/0182842 A1 | 7/2012 | Iwanabe et al. |
| 2013/0170331 A1 | 7/2013 | Contreras et al. |
| 2015/0162029 A1 | 6/2015 | Sasaki et al. |

OTHER PUBLICATIONS

Sasaki et al., U.S. Appl. No. 14/099,787, filed Dec. 6, 2013.

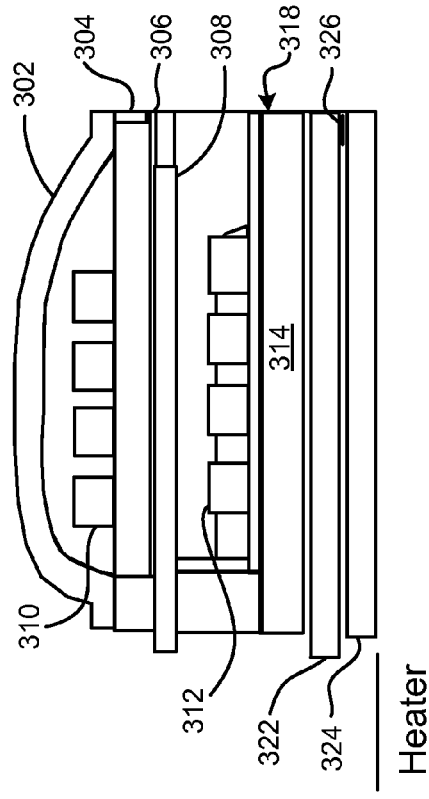
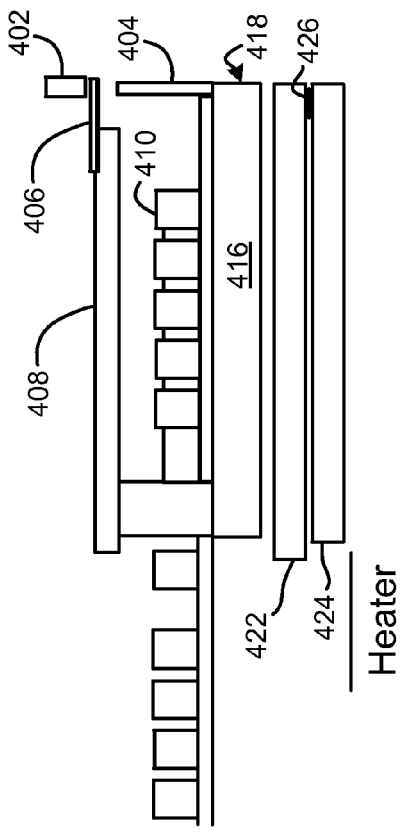
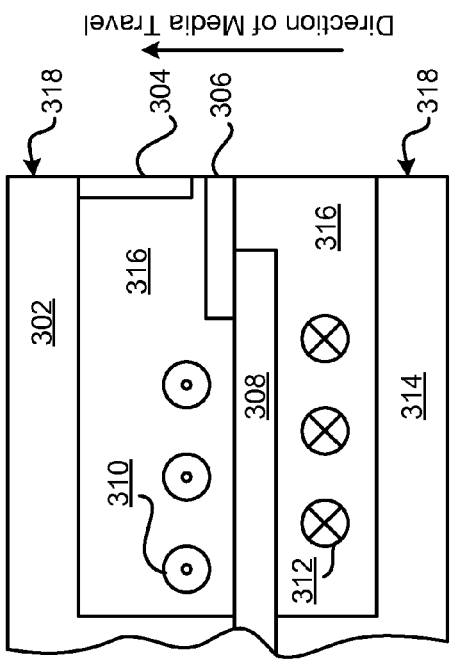
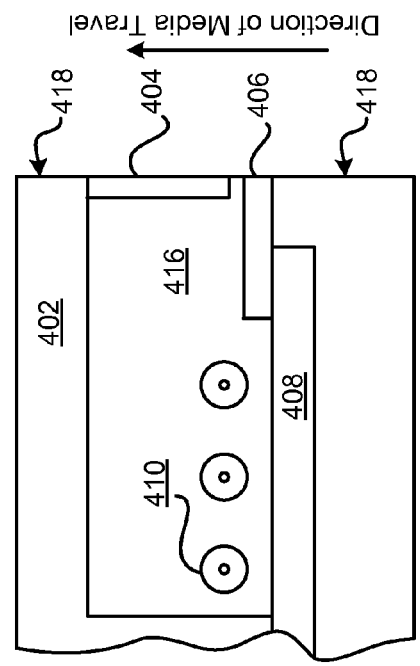

THERMALLY-ASSISTED MAGNETIC RECORDING HEAD

RELATED APPLICATIONS

This application is a continuation of U.S. patent application Ser. No. 14/099,787 filed Dec. 6, 2013, which is incorporated by reference.

FIELD OF THE INVENTION

The present invention relates to data storage systems, and more particularly, this invention relates to a thermally-assisted magnetic recording head and systems and operation thereof.

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. In particular, it is desired that HDDs be able to store more information in their limited area and volume. A technical approach to this desire is to increase the capacity by increasing the recording density of the HDD. To achieve higher recording density, further miniaturization of recording bits is effective, which in turn typically requires the design of smaller and smaller components.

One attempt at miniaturizing components has led to the use of thermally-assisted magnetic heads. These devices make use of near-field light that is generated from a near-field light transducer positioned near an air bearing surface of a recording device. However, when using these devices, near-field light may be generated from components other than the near-field transducer. This additional generated light acts as noise and reduces the performance of the thermally-assisted magnetic head.

SUMMARY

In one embodiment, a device includes a near-field light transducer having multiple apexes including a trailing-side apex positioned on a trailing side of the near-field light transducer. The device also includes a first material positioned near the trailing-side apex of the near-field light transducer, and a second material positioned near another apex of the near-field light transducer. The first material is physically characterized as etching more slowly than the second material.

In another embodiment, a method for forming a thermally-assisted magnetic head includes forming a first material, forming a near-field light transducer above the first material, the near-field light transducer including an electroconductive scattering body. The near-field light transducer has apexes including a trailing-side apex positioned on a trailing side of the near-field light transducer. The method also includes forming a second material above the near-field light transducer, and polishing a media-facing surface of the first material, the near-field light transducer, and the second material to form a media-facing surface of the near-field light transducer. The first material is positioned adjacent the trailing-side apex of the near-field light transducer, and the second material is positioned near other apexes of the near-field light transducer. The first material is recessed more slowly by the polishing than the second material.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 3A is a cross-sectional view of one particular embodiment of a perpendicular magnetic head with helical coils.

FIG. 3B is a cross-sectional view of one particular embodiment of a piggyback magnetic head with helical coils.

FIG. 4A is a cross-sectional view of one particular embodiment of a perpendicular magnetic head with looped coils.

FIG. 4B is a cross-sectional view of one particular embodiment of a piggyback magnetic head with looped coils.

DETAILED DESCRIPTION

Figure 1:
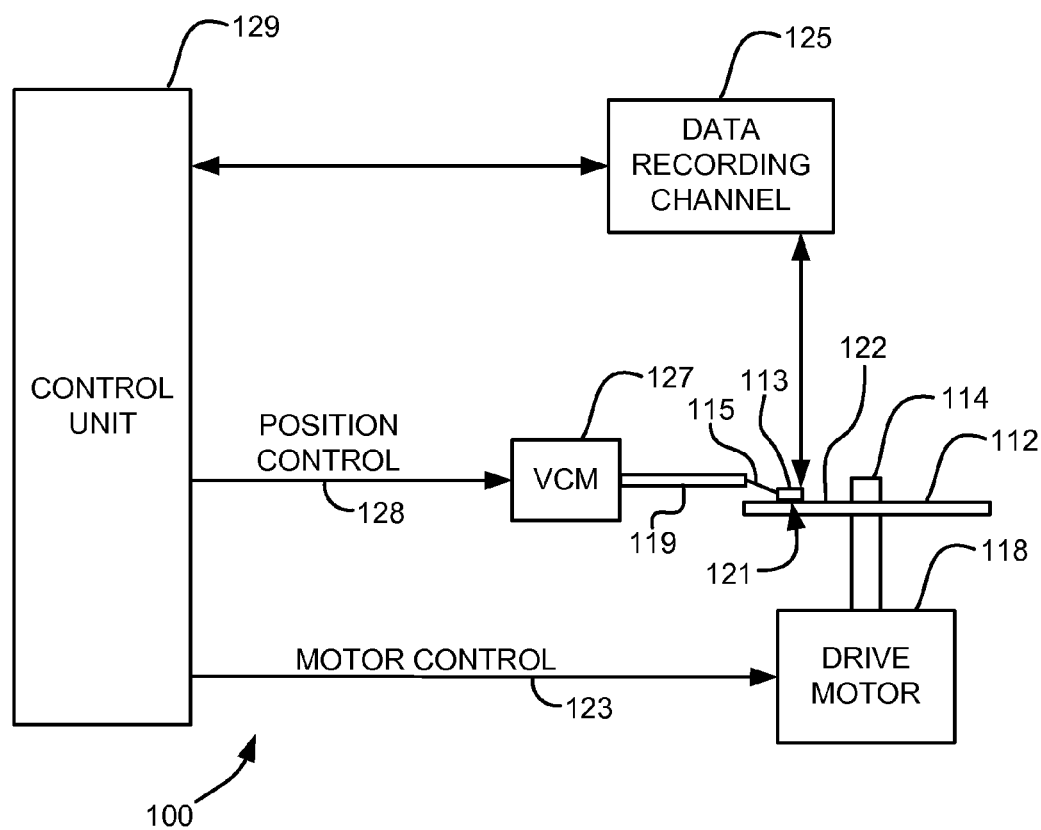
FIG. 1 is a simplified drawing of a magnetic recording disk drive system.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

To overcome the noise generated by light being scattered by components of a thermally-assisted magnetic head near the magnetic recording medium, a material may be used that reduces the scattering of the strong near-field light generated by the near-field light transducer. In one embodiment, a down-track apex (corner) of the near-field light transducer at the air bearing surface (ABS) or media-facing surface of the magnetic head may utilize this material. The material, in one approach, may have a hardness that is higher than a hardness of materials used for other components near to (and possibly other apexes of) the near-field light transducer.

Furthermore, in another embodiment, a polishing direction used during the polishing process of the media-facing surface of the magnetic head may be set in a direction which orients the down-track apex having the harder material on the down-track side, such that a recess is formed where at least one other apex is positioned so that this at least one other apex is recessed from the media-facing surface by at least at a penetration depth of the near-field light transducer. By utilizing a structure having these characteristics, noise may be suppressed during reading and writing using a thermally-assisted magnetic head.

In one general embodiment, a device includes a light source, a near-field light transducer including an electroconductive scattering body configured for generating near-field light when irradiated by light provided by the light source, wherein the near-field light transducer includes a triangular shape at a media-facing surface thereof having three apexes including a trailing-side apex positioned on a trailing side of the near-field light transducer, a main pole configured for writing data to a magnetic medium, the main pole being positioned in a down-track direction from the near-field light transducer, a first material positioned near the trailing-side apex of the near-field light transducer, and a second material positioned near other apexes of the near-field light transducer, wherein the near-field light transducer is configured to assist the main pole in writing data to the magnetic medium by production of the near-field light, and wherein the first material is more difficult to etch than the second material.

In another general embodiment, a method for forming a thermally-assisted magnetic head includes forming a main pole configured for writing data to a magnetic medium, forming a first material above the main pole, forming a near-field light transducer above the first material, the near-field light transducer including an electroconductive scattering body configured for generating near-field light when irradiated by light provided by a light source, wherein the near-field light transducer includes a triangular shape at a media-facing surface thereof having three apexes including a trailing-side apex positioned on a trailing side of the near-field light transducer, forming a second material above the near-field light transducer, and polishing a media-facing surface of the main pole, the first material, the near-field light transducer, and the second material to form a non-uniform media-facing surface of the near-field light transducer, wherein the main pole is positioned in a down-track direction from the near-field light transducer, wherein the first material is positioned adjacent the trailing-side apex of the near-field light transducer, wherein the second material is positioned near other apexes of the near-field light transducer, and wherein the first material and the second material include an insulating material.

Referring now to FIG. 1, there is shown a magnetic data storage device 100 (which may be a disk drive) in accordance with one embodiment of the present invention. As shown in FIG. 1, at least one rotatable magnetic medium (e.g., magnetic disk) 112 is supported on a spindle 114 and rotated by a drive mechanism, which may include a disk drive motor 118. The magnetic recording on each disk is typically in the form of an annular pattern of concentric data tracks (not shown) on the disk 112. Thus, the disk drive motor 118 preferably passes the magnetic disk 112 over the magnetic read/write portions 121, described immediately below.

At least one slider 113 is positioned near the disk 112, each slider 113 supporting one or more magnetic read/write portions 121, e.g., of a magnetic head according to any of the approaches described and/or suggested herein. As the disk 112 rotates, slider 113 is moved radially in and out over disk surface 122 so that portions 121 may access different tracks of the disk 112 where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider 113. The air bearing thus counter-balances the slight spring force of suspension 115 and supports slider 113 off and slightly above the disk surface 122 by a small, substantially constant spacing during normal operation. Note that in some embodiments, the slider 113 may slide along the disk surface 122.

The various components of the disk storage system are controlled in operation by control signals generated by controller 129, such as access control signals and internal clock signals. Typically, controller 129 comprises logic control circuits, storage (e.g., memory), and a microprocessor. In a preferred approach, the controller 129 is electrically coupled (e.g., via wire, cable, line, etc.) to the one or more magnetic read/write portions 121, for controlling operation thereof. The controller 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write portions 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write portion includes a coil layer embedded in one or more insulation layers (insulation stack), the insulation stack being located between first and second pole piece layers. A gap is formed between the first and second pole piece layers by a gap layer at an air bearing surface (ABS) of the write portion. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

The magnetic data storage device of FIG. 1 may include at least one thermally-assisted magnetic head as described herein according to any embodiment, a magnetic medium (such as a disk 112), a drive mechanism (such as disk drive motor 118) for passing the magnetic medium over the at least one thermally-assisted magnetic head, and a controller 129 electrically coupled to the at least one thermally-assisted magnetic head for controlling operation of the at least one thermally-assisted magnetic head.

Figure 2A:
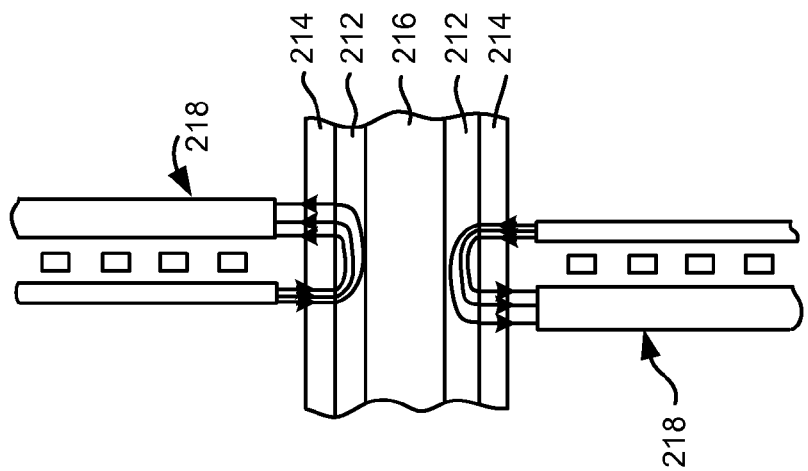
FIG. 2A is a schematic representation in section of a recording medium utilizing a longitudinal recording format.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

Figure 2B:
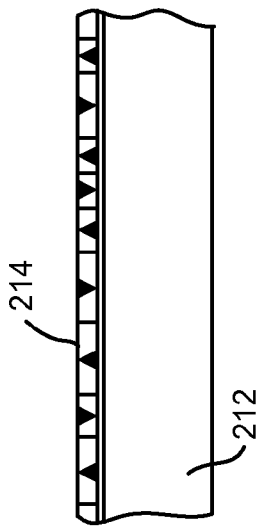
FIG. 2B is a schematic representation of a conventional magnetic recording head and recording medium combination for longitudinal recording as in FIG. 2A.

FIG. 2B shows the operative relationship between a conventional recording/playback head 204, which may preferably be a thin film head, and a conventional recording medium, such as that of FIG. 2A.

Figure 2C:
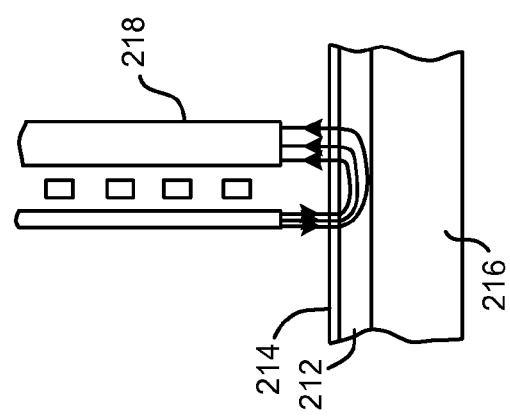
FIG. 2C is a magnetic recording medium utilizing a perpendicular recording format.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

Figure 2D:
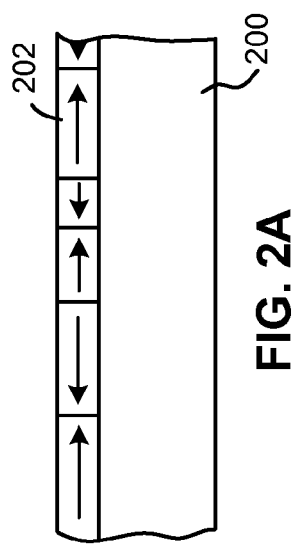
FIG. 2D is a schematic representation of a recording head and recording medium combination for perpendicular recording on one side.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

Figure 2E:
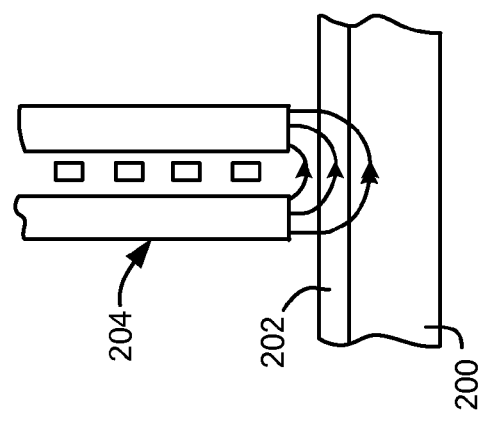
FIG. 2E is a schematic representation of a recording apparatus adapted for recording separately on both sides of the medium.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

FIG. 4B illustrates another type of piggyback magnetic head having similar features to the head of FIG. 4A including a looped coil 410, which wraps around to form a pancake coil. Also, sensor shields 422, 424 are shown. The sensor 426 is typically positioned between the sensor shields 422, 424.

In FIGS. 3B and 4B, an optional heater is shown near the non-ABS side of the magnetic head. A heater (Heater) may also be included in the magnetic heads shown in FIGS. 3A and 4A. The position of this heater may vary based on design parameters such as where the protrusion is desired, coefficients of thermal expansion of the surrounding layers, etc.

Except as otherwise described herein, the various components of the structures of FIGS. 3A-4B may be of conventional materials and design, as would be understood by one skilled in the art.

Figure 5:
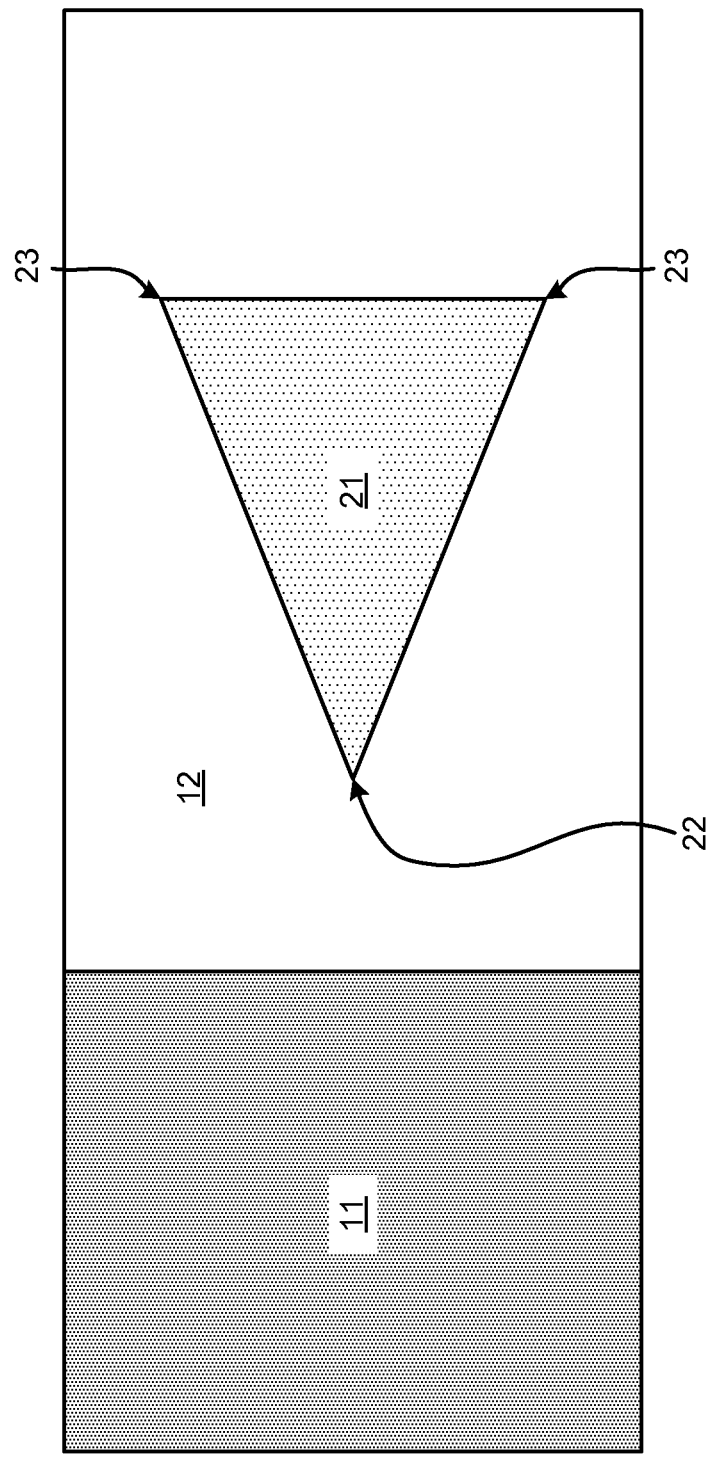
FIG. 5 shows a media-facing surface of a portion of a conventional head having a near-field light transducer.

Now referring to FIG. 5, as disclosed in Unexamined Japanese Patent Appl. No. 2004-151049, a near-field light transducer 21 may comprise a planar scattering body having a triangular shape. This triangular scattering body may achieve extremely high near-field light generation efficiency. In this near-field light transducer 21, when the frequency of the light and the resonance frequency of the plasmon generated in a metal of the near-field light transducer 21 match, an extremely high efficiency is obtained. However, one problem occurs where weak near-field light is generated at components and/or parts other than a trailing-side apex 22 that generates the near-field light.

In Japanese Patent Appl. No. 2004-151049, for example, when a scattering body having a triangular shape as shown in FIG. 5 is used, only strong near-field light generated by the trailing-side apex 22 is provided for recording on the medium, and noise generation is suppressed by burying the surface of the near-field light transducer 21 except for trailing-side apex 22 because weak near-field light is also generated at apexes 23 in addition to trailing-side apex 22. Therefore, the distance to the recording medium from the other parts or components is at least the penetration depth of the near-field light. In order to bury all parts and components other than trailing-side apex 22, Japanese Patent Appl. No. 2004-151049 discloses a method that irradiates an ion beam from in front of the tip toward trailing-side apex 22 to etch everything other than an area in the vicinity of trailing-side apex 22.

In a thermally-assisted magnetic head, material used for the near-field light transducer is typically a material having high electroconductivity, such as gold, silver, copper, etc. In many conventional heads, gold is used due to its excellent corrosion resistance. In addition, the insulation material 12 surrounding an apex has excellent insulation properties, and may comprise $SiO_2$, $Al_2O_2$, MgO, etc. In a thermally-assisted magnetic head, because the magnetic poles of the read element, the write element, and the light-generating portion of the near-field light transducer are positioned as close as possible to the magnetic recording medium, when the media-facing surface of the read and/or write element of the thermally-assisted magnetic head is etched, for example, by an ion beam, and a step difference is created in the media-facing surface of each element, a reduction in the read-back sensitivity and/or the write efficiency is incurred.

In Japanese Patent Appl. No. 2004-151049, etching by an ion beam is used as the processing method for forming steps in the surface of the near-field light transducer 21, but the etching rate of the insulating material 12 is fast compared to that of a magnetic material used for the near-field light transducer 21. Therefore, the tip position of the trailing-side apex 22 is unfortunately buried more deeply by the etching of these insulating materials 12 than is desired, and the recess is enlarged for the read and write elements. This results in a decrease in the utilization rate of the near-field light and the effectiveness of the thermal assistance is decreased.

The problems described above may be overcome using the structures and methods described herein, according to various embodiments.

After a magnetic head is polished in order to form the media-facing surface, and a minute amount of the surface is removed by dry etching, a protective film for the ABS is formed. In this series of processes, the surface shape of the near-field light transducer 21 is formed in at the media-facing surface. When the insulation material 12 surrounding the near-field light transducer 21 becomes homogeneous, it is difficult to reduce the recess only at the trailing-side apex 22 by dry etching. Two solutions for this situation are contemplated. In a first solution, the insulation material 12 surrounding the trailing-side apex 22 may comprise a material that is more difficult to etch using a dry-etching process than a material which is positioned at the media-facing surface around the other apexes 23. According to a second solution, in the polishing process that occurs prior to dry etching, polishing is performed in a polishing direction such that the trailing-side apex 22 is positioned downstream during polishing, e.g., the polishing is performed from leading side to trailing side, such that only the trailing-side apex 22 and portions surrounding trailing-side apex 22 remain elevated after the polishing process. The surface material flows toward the trailing-side apex 22 in the polishing process while forming the near-field light transducer 21, with the surface material comprising a material having high ductility, such as gold.

By using either of the solutions described above, in unison or independently, an adequate recess may be formed between trailing-side apex 22 and the other apexes 23.

Figure 6:
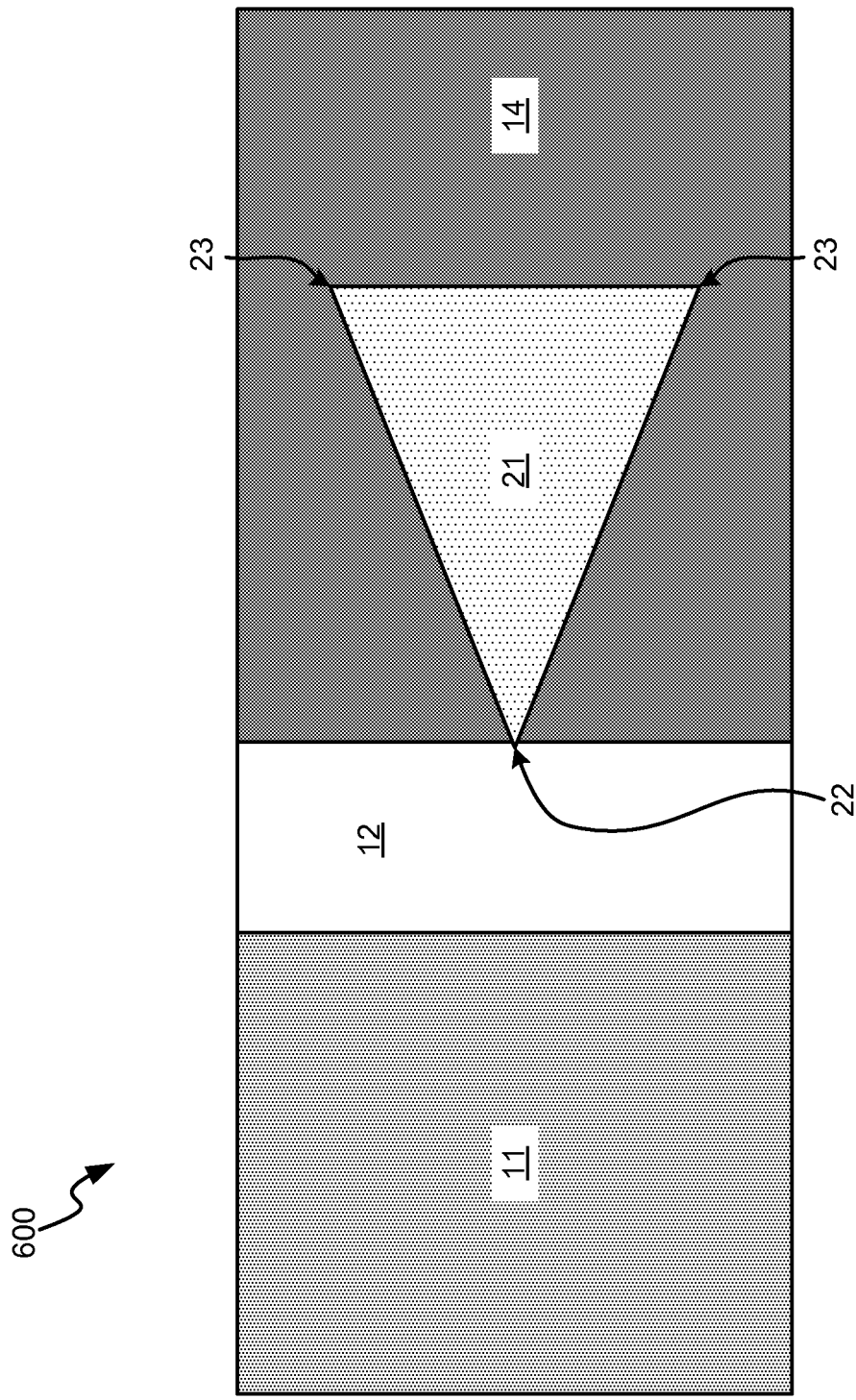
FIG. 6 shows a media-facing surface of a portion of a magnetic head having a near-field light transducer in accordance with one embodiment.

Now referring to FIG. 6, a media-facing surface of a portion of a magnetic head 600 having a near-field light transducer 21 is shown in accordance with one embodiment. As an option, the present magnetic head 600 may be implemented in conjunction with features from any other embodiment listed herein, such as those described with reference to the other Figures. Of course, however, such magnetic head 600 and others presented herein may be used in various applications and/or in permutations which may or may not be specifically described in the illustrative embodiments listed herein. Further, the magnetic head 600 presented herein may be used in any desired environment.

Conventionally, the material surrounding the near-field light transducer 21 is a homogeneous material, but in this embodiment, material 12 positioned near and around a trailing-side apex 22 at the media-facing surface from which the high-energy light is generated for assisted recording may comprise a material that is more difficult to etch (etches slower) compared to the material positioned around the other apexes 23 at the media-facing surface. Specifically, material 14 positioned near to and around the other apexes 23 may comprise silicon dioxide ($SiO_2$) or some other easily etched material known in the art which provides insulation to the near-field light transducer 21. In contrast, material 12 near to and/or around trailing-side apex 22 at the media-facing surface may comprise alumina ($Al_2O_3$) or some other insulative material that is more difficult to etch (etches slower) than the material 14 positioned near to and around the other apexes 23.

In a manufacturing method to form this structure, after the near-field light transducer 21 is formed, wafer processing is carried out in which etching via chemical mechanical polishing (CMP), dry etching, etc., is performed on the media-facing surface to expose the trailing-side apex 22 of the near-field light transducer 21 after forming the near-field light transducer 21 (using gold or some other suitable material or combination of materials known in the art). Then, material 12 (which may comprise alumina or some other suitable material that is more difficult to etch than material 14) is deposited in a film where trailing-side apex 22 was exposed.

In another embodiment, material 12 may be formed prior to forming the near-field light transducer 21, such that upon formation of the near-field light transducer 21 and material 14 near other apexes 23, the structure is ready for further processing.

As shown in FIG. 6, this film 12 is positioned between the main pole 11 and the near-field light transducer 21; however, this is not required. Instead, the trailing-side apex 22 from which the high-energy light that assists in magnetic recording is provided is surrounded by or in some way near to material 12 which is more difficult to etch than material 14 positioned near to or otherwise surrounding other apexes 23 of the near-field light transducer 21.

Figure 7:
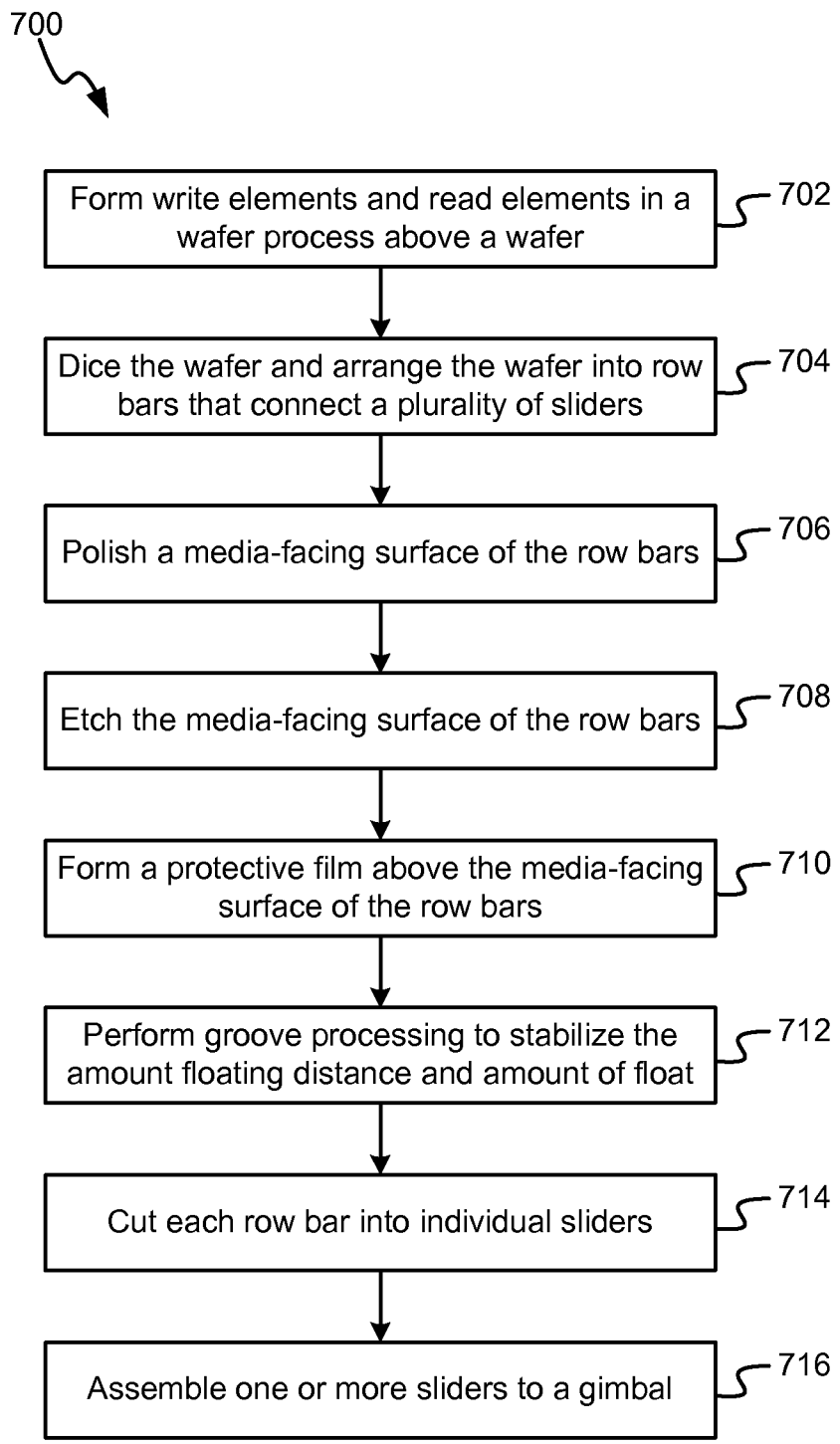
FIG. 7 shows a process flow for manufacturing a magnetic head, according to one embodiment.

FIG. 7 shows a process flow chart of a method 700 for forming a thermally-assisted magnetic head, according to one embodiment. As an option, the present method 700 may be implemented to construct structures as shown herein according to various embodiments, including those shown in FIGS. 1-6 and 8-14. Of course, however, this method 700 and others presented herein may be used to form magnetic structures for a wide variety of devices and/or purposes which may or may not be related to magnetic recording. Further, the methods presented herein may be carried out in any desired environment. It should also be noted that any aforementioned features may be used in any of the embodiments described in accordance with the various methods.

After the write element and the read element are formed in a wafer process above a wafer (such as a glass substrate, a ceramic substrate, etc.) as shown in operation 702, the wafer is diced and arranged in a row bar that connects a plurality of sliders as shown in operation 704. One cut surface of each row bar becomes the media-facing surface for reading from and writing to the magnetic medium (disk), and the read and write elements are exposed to the media-facing surface. The smoothness of the media-facing surface is improved by a process for polishing the media-facing surface as shown in operation 706, and the positions where the magnetic read and write elements are exposed are and independently adjusted to a proper depth as known in the art. As shown in operation 708, the media-facing surface is etched several nanometers (nm) by dry etching (or some other suitable technique known in the art), and the media-facing surface is cleaned. After the protective film of the media-facing surface is formed following the dry etching process as shown in operation 710, groove processing is conducted to stabilize the amount floating distance and amount of float as shown in operation 712. Then, as shown in operation 714, the row bar is cut into individual sliders (each slider may comprise a write element, a read element, or one or more of both a write and a read element, in various configurations) and as shown in operation 716, one or more of the individual sliders are assembled to the gimbal to complete the magnetic head.

Of course, this is just one exemplary manufacturing method, and any other manufacturing method known in the art for forming a magnetic head may be used with the embodiments described herein.

Figure 8:
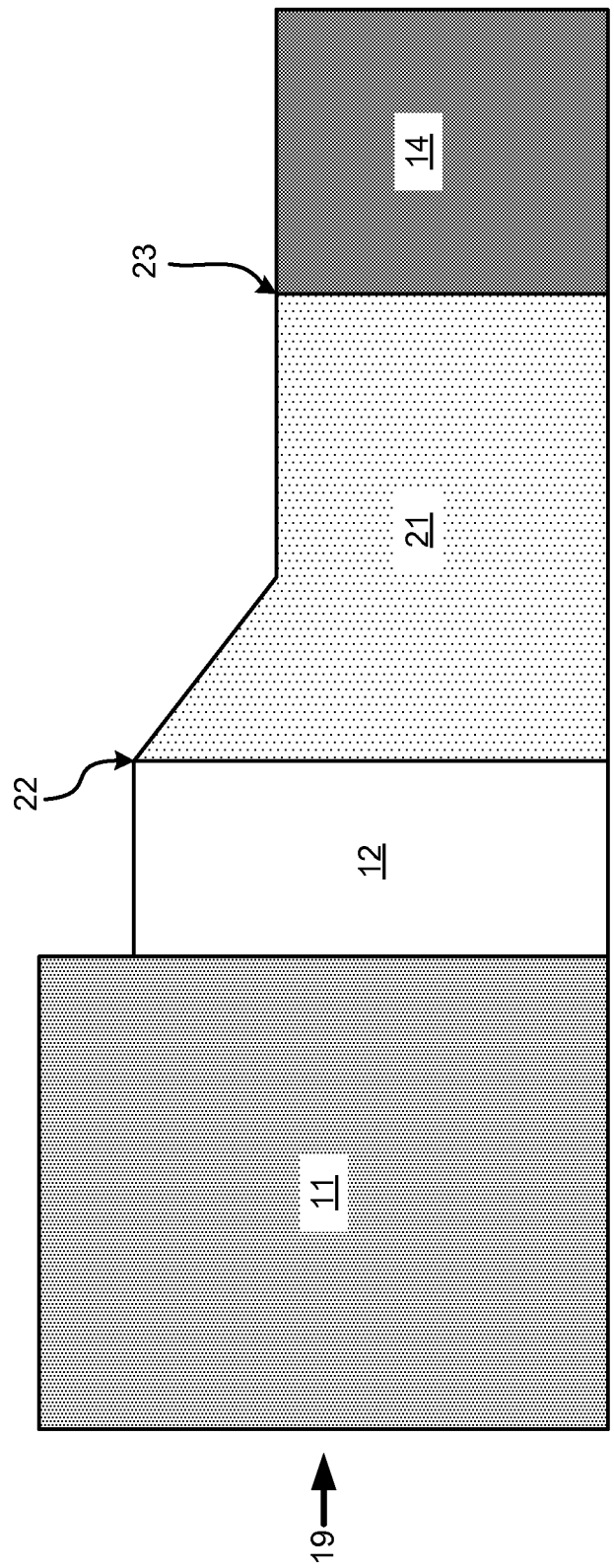
FIG. 8 shows a portion of a magnetic head having a near-field light transducer according to a first embodiment.

Now referring to FIG. 8, the shape of a cross-sectional plane near the media-facing surface 19 obtained as a result of processing the magnetic head is shown according to one embodiment. As an option, the present magnetic head may be implemented in conjunction with features from any other embodiment listed herein, such as those described with reference to the other Figures. Of course, however, such magnetic head and others presented herein may be used in various applications and/or in permutations which may or may not be specifically described in the illustrative embodiments listed herein. Further, the magnetic head presented herein may be used in any desired environment. The magnetic head comprises a near-field light transducer 21, similar to that shown in FIG. 6, by the processes described above in relation to FIG. 7. In this exemplary embodiment shown in FIG. 8, material 12 (which may comprise alumina, for example) is recessed approximately 1.5 nm with respect to the main pole 11, and material 14 (which may comprise silicon dioxide, for example) is further recessed by approximately 4 nm. The surface shape of the near-field light transducer 21 may be formed by etching the trailing-side apex 22 along the height of the material 12 via a dry etching process. In this exemplary embodiment, apexes 23 may be recessed by about 4 nm with respect to trailing-side apex 22.

According to this exemplary embodiment, a structure in which trailing-side apex 22 is 4 nm higher than the other apexes 23 may be obtained without altering the processing steps after forming the near-field light transducer 21 in one approach.

However, in this exemplary embodiment, the trailing-side apex 22 is recessed 1.5 nm with respect to the media-facing surface of the main pole 11, and contrast with respect to the other apexes 23 may be obtained to some degree. A concern with this structure is that the use efficiency of near-field light decreases when separated by about 1.5 nm or more from the magnetic medium to be written. This is very close to the amount of recess that is created for the trailing-side apex 22 of the near-field light transducer 21.

Therefore, a method for moving the position of the trailing-side apex 22 closer to the medium or closer to the media-facing surface of the main pole 11 is desired. One such method is shown in FIG. 9 according to one embodiment.

Figure 9:
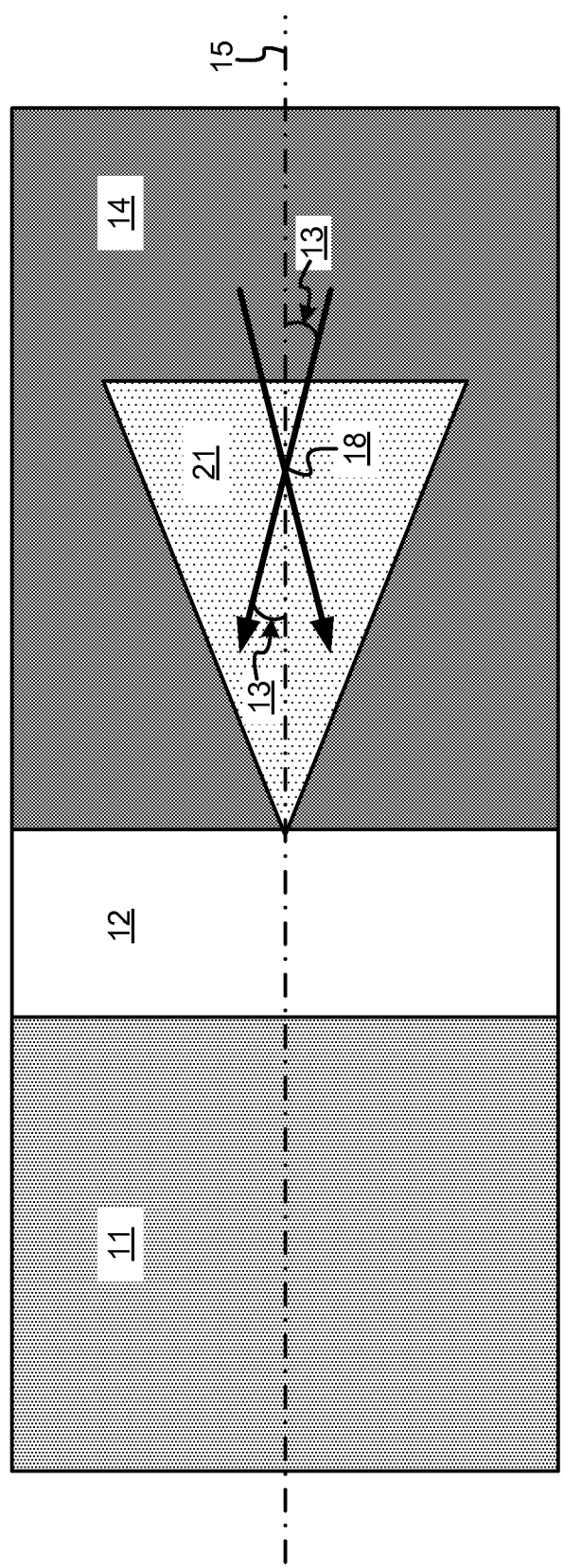
FIG. 9 shows a media-facing surface of a portion of a magnetic head having a near-field light transducer in a polishing method in accordance with another embodiment.

In the exemplary embodiment shown in FIG. 9, motion of the row bar on the polishing plate is controlled so that the polishing direction 18 in the final step of the polishing process places the trailing-side apex 22 downstream. In the polishing process, the polishing process advances by rotating the plate embedded with polishing particles, and by pushing the media-facing surface of the row bar, the processing target, on top. The polishing process advances fixed in the direction of the center line 15 in FIG. 9 when the lengthwise direction of the row bar perpendicular is set in the direction of rotation and the trailing-side apex 22 side is set downstream. The center line 15 is positioned to be about perpendicular to a plane of deposition of the main pole.

The row bar vibrates in the direction of the diameter of the fixed plate in addition to uniform use in the inner and outer periphery on the polishing plate. Therefore, the relative speed vector with the plate holds some angle 13 from the center line 15. However, according to various embodiments, the vibration speed may be set so that the angle 13 from the center line is, at a maximum, less than or equal to about ±45°. In other words, the vibration speed during the polishing is set so as to cause the polishing direction 18 to remain within about ±45° of the direction perpendicular to the plane of deposition of the main pole (e.g., the center line 15).

Figure 10:
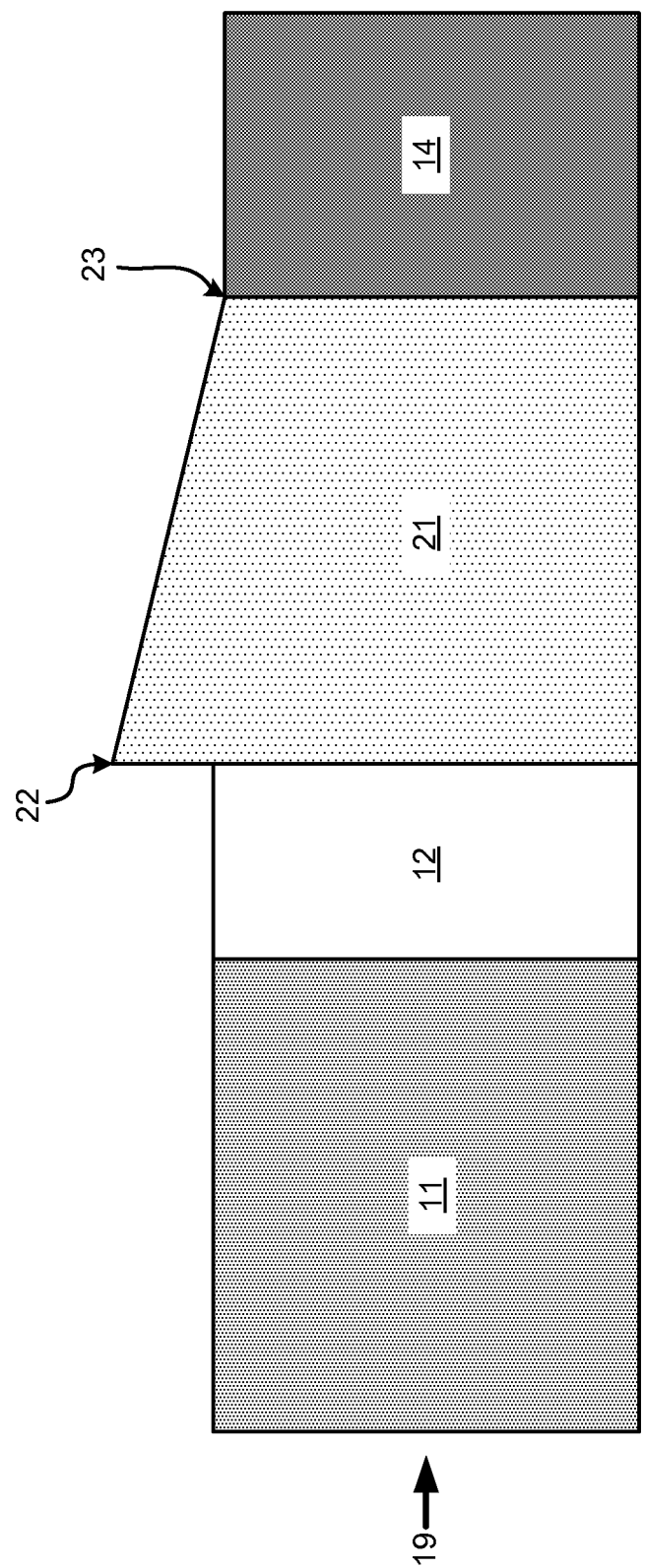
FIG. 10 shows a portion of a magnetic head having a near-field light transducer according to another embodiment.

This results in a shape at the media-facing surface 19 immediately after polishing to be a shape in which the trailing-side apex 22 of the near-field light transducer 21 protruding by about 2 nm from the media-facing surface of the main pole 11 as shown in FIG. 10, according to one embodiment. When the near-field light transducer 21 comprises a highly ductile material such as gold, the surface of the near-field light transducer 21 flows in the direction of motion of the polishing plate. However, the material of the near-field light transducer 21 that flowed to the trailing-side apex 22 is believed to stop there, and this causes the end thereof to protrude.

Figure 11:
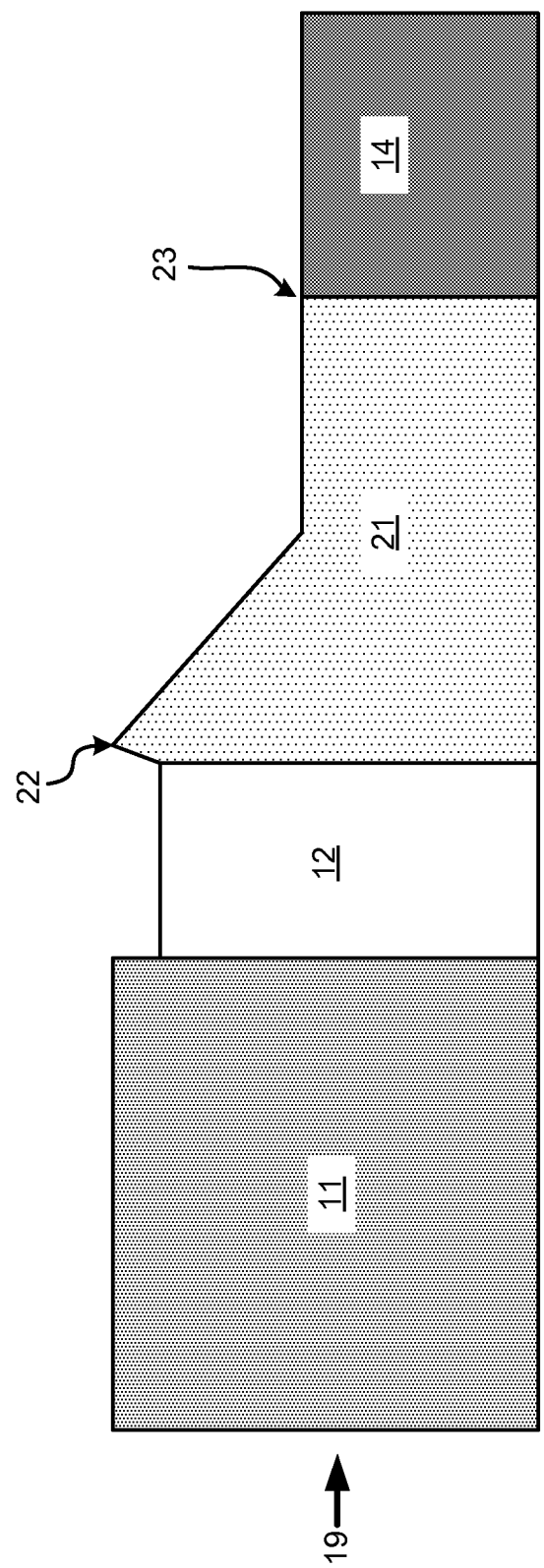
FIG. 11 shows a portion of a magnetic head having a near-field light transducer according in another embodiment.

In this state, the surface shape becomes as shown in FIG. 11 by an etching process as previously described, according to one exemplary embodiment. The recess amount with respect to the main pole 11 of the trailing-side apex 22 becomes less than about ±0.5 nm, such as about 0 nm, and high-energy light may be generated at a position closer to the medium, which is desirable.

Figure 12:
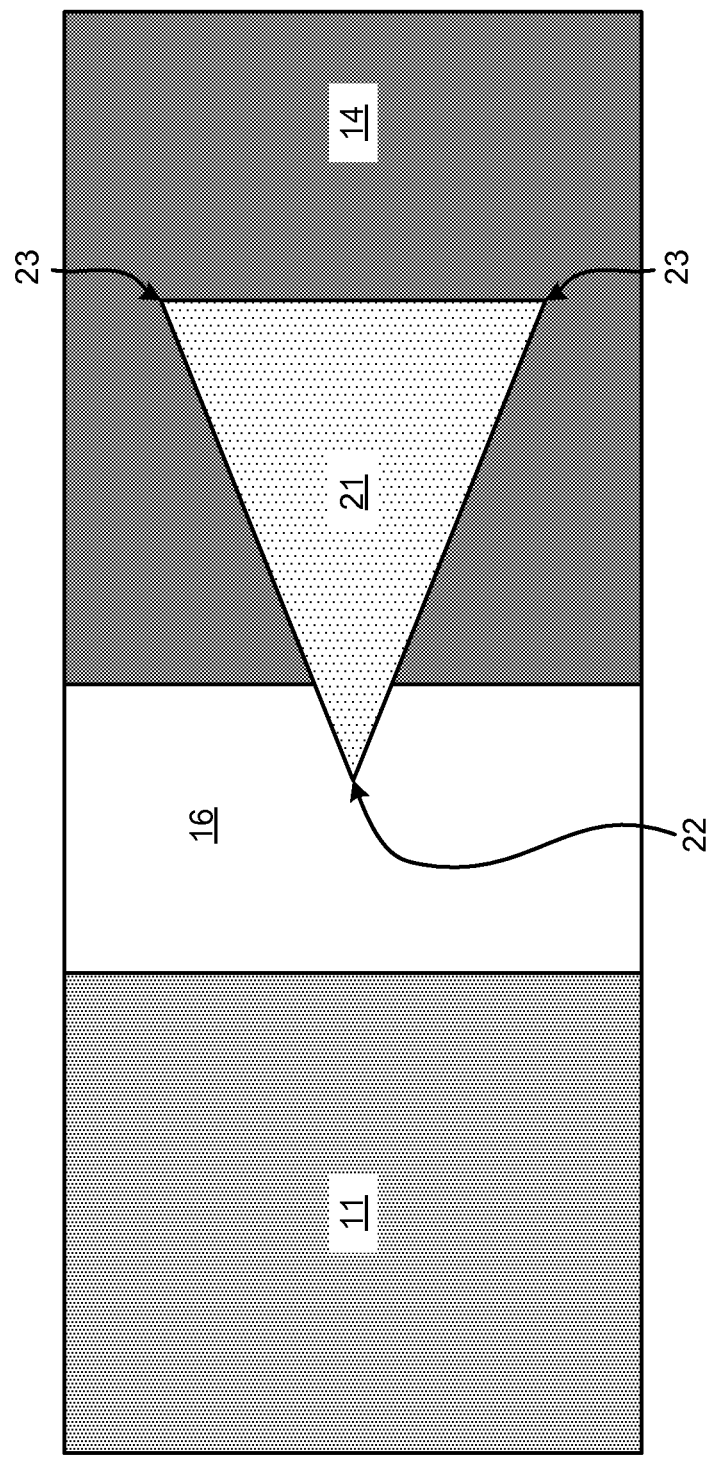
FIG. 12 shows a media-facing surface of a portion of a magnetic head having a near-field light transducer in another embodiment.

FIG. 12 shows a media-facing surface of a portion of a magnetic head having a near-field light transducer 21 in another embodiment. As an option, the present magnetic head may be implemented in conjunction with features from any other embodiment listed herein, such as those described with reference to the other Figures. Of course, however, such magnetic head and others presented herein may be used in various applications and/or in permutations which may or may not be specifically described in the illustrative embodiments listed herein. Further, the magnetic head presented herein may be used in any desired environment.

In this exemplary embodiment, the material 16 located near the trailing-side apex 22 is formed to overlap the periphery of the trailing-side apex 22 along a media-facing surface more than the material 12 in the structures shown in FIGS. 6 and 8-11. Referring again to FIG. 12, this structure may be implemented by forming the near-field light transducer 21 enclosed by the surrounding material 14 in the wafer process, etching back the material 14 by a reactive ion etching (RIE) process (or some other suitable etching process known in the art) to selectively etch the near-field light transducer 21 material and expose the trailing-side apex 22, terminating the etching when the projection is approximately several nanometers (nm) in height, and depositing the material 16 as a film near to and overlapping the periphery of the trailing-side apex 22. By overlapping the periphery, what is meant is that, in contrast to the material 12 in structures shown in FIGS. 6 and 8-11 which only touches the trailing-side apex 22 along the media-facing surface (or barely touches any of the sidewalls along the media-facing surface) of the near-field light transducer 21, in the structure described by FIG. 12, the material 16 completely surrounds the trailing-side apex 22 along the media-facing surface and touches a portion of each sidewall extending therefrom of the near-field light transducer 21 along the media-facing surface.

Figure 13:
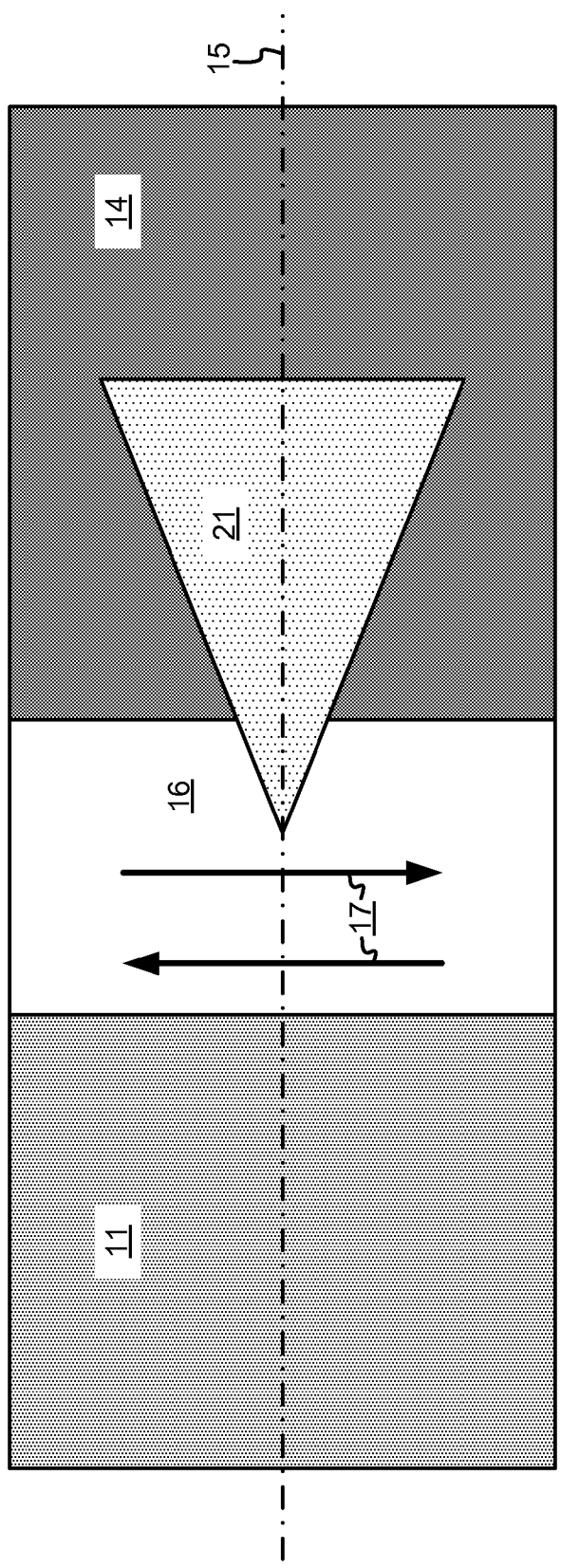
FIG. 13 shows a media-facing surface of a portion of a magnetic head having a near-field light transducer in a polishing method in yet another embodiment.

This structure may obtain a shape nearly identical to the structures described previously by the same processes as described above. However, in this exemplary embodiment, polishing may be in a direction 17 perpendicular to the center line 15 as shown in FIG. 13. In other words, polishing may be performed in a direction along a line parallel to a plane of deposition of the main pole (e.g., the center line 15).

Figure 14:
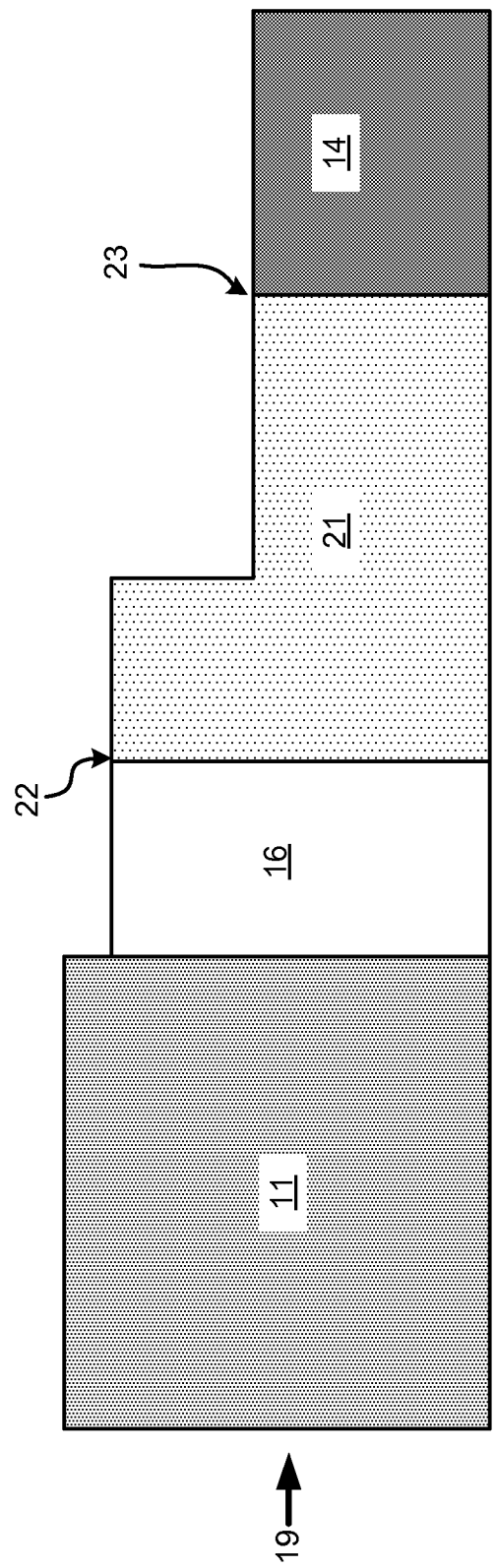
FIG. 14 shows a portion of a magnetic head having a near-field light transducer in another embodiment.

Thus, as shown in FIG. 14 according to one exemplary embodiment, a difference in height at the media-facing surface 19 of the magnetic head is developed. This step difference is generated based on the difference between the hardness of material 16 and material 14. Therefore, the media-facing surface of the near-field light transducer 21 comprises a stepped profile which corresponds to the materials surrounding trailing-side apex 22 and apexes 23. In this exemplary embodiment, alumina or some other suitably hard insulative material may be used for material 16, while silicon dioxide or some other suitably less hard insulative material may be used for material 14. The result of the polishing process is that the apexes 23 are formed with about a 2 nm recess with respect to trailing-side apex 22. From this exemplary embodiment, light generation may be reduced at apexes 23 other than trailing-side apex 22, which in turn decreases noise generated by the magnetic head due to light leakage.

In a near-field light transducer using a scattering body as described according to any embodiment herein, the effect of the near-field light generated at components other than the point that generates strong high energy near-field light may be reduced.

Figure 15:
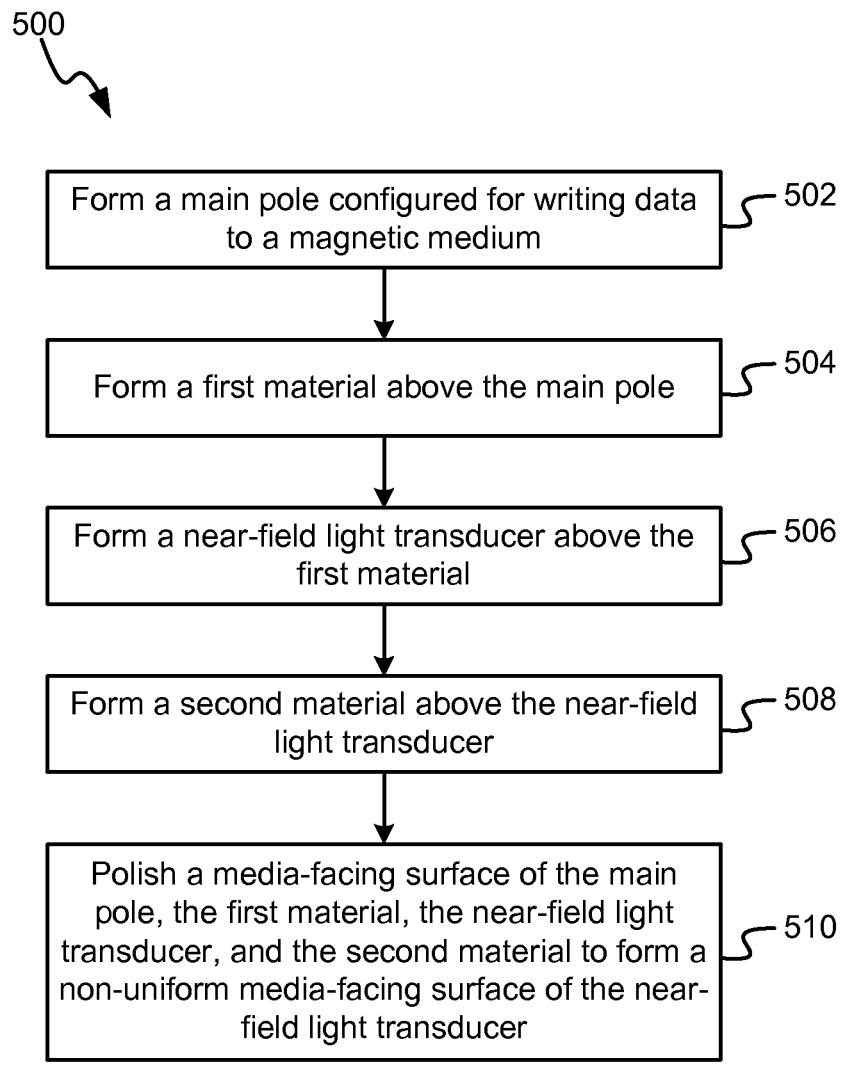
FIG. 15 shows a flowchart of a method according to one embodiment.

FIG. 15 shows a method 500 for forming a thermally-assisted magnetic head, in accordance with one embodiment. As an option, the present method 500 may be implemented to construct structures such as those shown in FIGS. 1-6 and 8-14. Of course, however, this method 500 and others presented herein may be used to form magnetic structures for a wide variety of devices and/or purposes which may or may not be related to magnetic recording. Further, the methods presented herein may be carried out in any desired environment. It should also be noted that any aforementioned features may be used in any of the embodiments described in accordance with the various methods.

In operation 502, a main pole configured for writing data to a magnetic medium is formed using any material and technique known in the art. For example, the main pole may comprise Co, Fe, Pt, or some combination thereof.

In operation 504, a first material above the main pole is formed using any material and technique known in the art. In one embodiment, the first material may be an insulating material, such as alumina, magnesium oxide, silicon dioxide, etc.

In operation 506, a near-field light transducer is formed above the first material and/or may be formed adjacent some portions of the first material.

The near-field light transducer comprises an electroconductive scattering body configured for generating near-field light when irradiated by light provided by a light source. Also, the near-field light transducer comprises a triangular shape at a media-facing surface thereof having at least three apexes including a trailing-side apex positioned on a trailing side of the near-field light transducer (closest to the main pole). In other approaches, some other efficient light scattering shape with one apex positioned closest to the main pole, which is configured to produce high-energy light for assisted recording, may be used as would be known by one of skill in the art.

In operation 508, a second material is formed above the near-field light transducer using any material and technique known in the art. In one embodiment, the second material may be an insulating material, such as alumina, magnesium oxide, silicon dioxide, etc.

In one approach, the first material may be more difficult to etch than the second material. In a further embodiment, the first material may be harder than the second material. In another further embodiment, the first material may comprise or may be constituted of alumina, while the second material may comprise or may be constituted of silicon dioxide.

In operation 510, a media-facing surface of the main pole, the first material, the near-field light transducer, and the second material are polished to form a non-uniform media-facing surface of the near-field light transducer.

In method 500, the main pole is positioned in a down-track direction from the near-field light transducer, the first material is positioned adjacent the trailing-side apex of the near-field light transducer, and the second material is positioned near other apexes of the near-field light transducer.

In one embodiment, the polishing may be performed in a direction such that the trailing-side apex is positioned downstream during the polishing and the other apexes of the near-field light transducer are positioned upstream. Furthermore, in some approaches, a vibration speed during the polishing may be set so as to cause the polishing direction to remain within about ±45° of a direction perpendicular to a plane of deposition of the main pole. In this way, material from the near-field light transducer which is picked up in the polishing process may be moved toward the trailing-side apex and deposited there, which effectively raises the media-facing surface of the trailing-side apex. Then, during a subsequent etching process, the trailing-side apex may be made to have a height that is the same as the media-facing surface of the main pole.

In an alternate embodiment, the polishing may be performed in a direction along a line parallel to a plane of deposition of the main pole. In this way, steps may be formed across the media-facing surface of the main pole, first material, near-field light transducer, and second material, with each element being stepped further down from the media-facing surface of the main pole. Furthermore, the near-field light transducer may have a stepped media-facing surface having two or more heights there across.

In accordance with another embodiment, the media-facing surface of the near-field light transducer may comprise a first portion positioned adjacent a plane parallel with a media-facing surface of the main pole and one or more other portions thereof recessed from the plane parallel with the media-facing surface of the main pole. The media-facing surface of the first material may be recessed from the plane parallel with the media-facing surface of the main pole less than a media-facing surface of the second material, and the first portion may be coexistent with the first material and the other portions may be coexistent with the second material (as these materials surrounding the near-field light transducer aid in the polishing effect).

In a further embodiment, the first material may overlap a periphery of the near-field light transducer along a media-facing surface thereof.

In another embodiment, a media-facing surface of the first material may be recessed from a plane parallel with a media-facing surface of the main pole less than a media-facing surface of the second material, the media-facing surface of the first material being recessed by about 0.5 nm or less, and the media-facing surface of the second material being recessed by about 2.0 nm or more.

It should be noted that methodology presented herein for at least some of the various embodiments may be implemented, in whole or in part, in computer hardware, software, by hand, using specialty equipment, etc. and combinations thereof.

Moreover, any of the structures and/or steps may be implemented using known materials and/or techniques, as would become apparent to one skilled in the art upon reading the present specification.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A device, comprising:
a near-field light transducer having multiple apexes including a trailing-side apex positioned on a trailing side of the near-field light transducer;
a first material positioned near the trailing-side apex of the near-field light transducer; and
a second material positioned near another apex of the near-field light transducer,
wherein the first material is physically characterized as etching more slowly than the second material.

2. The device as recited in claim 1, wherein the first material is harder than the second material.

3. The device as recited in claim 1, wherein media-facing surfaces of the first and second materials are recessed relative to a plane extending along a media-facing surface of a main pole located near the near-field transducer, wherein a media-facing surface of the second material is more recessed relative to the plane than a media-facing surface of the first material.

4. The device as recited in claim 3, wherein the media-facing surface of the first material is recessed from the plane by about 0.5 nm or less.

5. The device as recited in claim 3, wherein the media-facing surface of the second material is recessed from the plane by about 2.0 nm or more.

6. The device as recited in claim 1, wherein a media-facing surface of the near-field light transducer is non-planar with a first portion thereof being positioned on or above a plane extending along a media-facing surface of a main pole located near the near-field transducer, and other portions thereof being recessed relative to the plane.

7. The device as recited in claim 6, wherein a media-facing surface of the first material is less recessed from the plane than a media-facing surface of the second material.

8. The device as recited in claim 7, wherein a difference in recession between the media-facing surface of the first material and the media-facing surface of the second material is about 2 nm or more.

9. The device as recited in claim 6, wherein the media-facing surface of the first portion is coextensive with the media-facing surface of the first material and the media-facing surface of the other portions are coextensive with the media-facing surface of the second material.

10. The device as recited in claim 9, wherein the first material overlaps a periphery of the near-field light transducer along a media-facing surface thereof.

11. The device as recited in claim 1, wherein the first material comprises alumina and the second material comprises silicon dioxide.

12. A magnetic data storage system, comprising:
at least one device as recited in claim 1;
a magnetic medium;
a drive mechanism for passing the magnetic medium over the at least one device; and
a controller electrically coupled to the at least one device for controlling operation of the at least one device.

13. A method for forming a thermally-assisted magnetic head, the method comprising:
forming a first material;
forming a near-field light transducer above the first material, the near-field light transducer comprising an electroconductive scattering body, wherein the near-field light transducer has apexes including a trailing-side apex positioned on a trailing side of the near-field light transducer;
forming a second material above the near-field light transducer; and
polishing a media-facing surface of the first material, the near-field light transducer, and the second material to form a media-facing surface of the near-field light transducer, wherein the first material is positioned adjacent the trailing-side apex of the near-field light transducer,
wherein the second material is positioned near other apexes of the near-field light transducer, and
wherein the first material is recessed more slowly by the polishing than the second material.

14. The method as recited in claim 13, wherein the polishing is performed in a direction such that the trailing-side apex is positioned downstream during the polishing and the other apexes of the near-field light transducer are positioned upstream.

15. The method as recited in claim 14, further comprising setting a vibration speed during the polishing that causes a direction of the polishing to remain within about ±45° of a direction perpendicular to a plane of deposition of the first material.

16. The method as recited in claim 13, wherein the polishing is performed in a direction along a line parallel to a plane of deposition of the first material.

17. The method as recited in claim 13, wherein a media-facing surface of the first material is recessed by the polishing less than a media-facing surface of the second material.

18. The method as recited in claim 13, wherein the media-facing surface of the near-field light transducer comprises:
a first portion positioned closer to a plane extending along a media-facing surface of a main pole located near the near-field transducer; and
one or more other portions of the near-field light transducer positioned farther from the plane.

19. The method as recited in claim 18, wherein the media-facing surface of the first material is recessed from a plane extending along a media facing surface of a main pole located near the near-field transducer by about 0.5 nm or less, wherein the media-facing surface of the second material is recessed by about 2.0 nm or more from the plane.

20. The method as recited in claim 13, wherein the first material is harder than the second material.

* * * * *